Sept. 13, 1938.  W. T. DUNN  2,129,829
COMBINED MOTOR AND TRANSMISSION MOUNTING
Filed Dec. 21, 1935  3 Sheets-Sheet 1
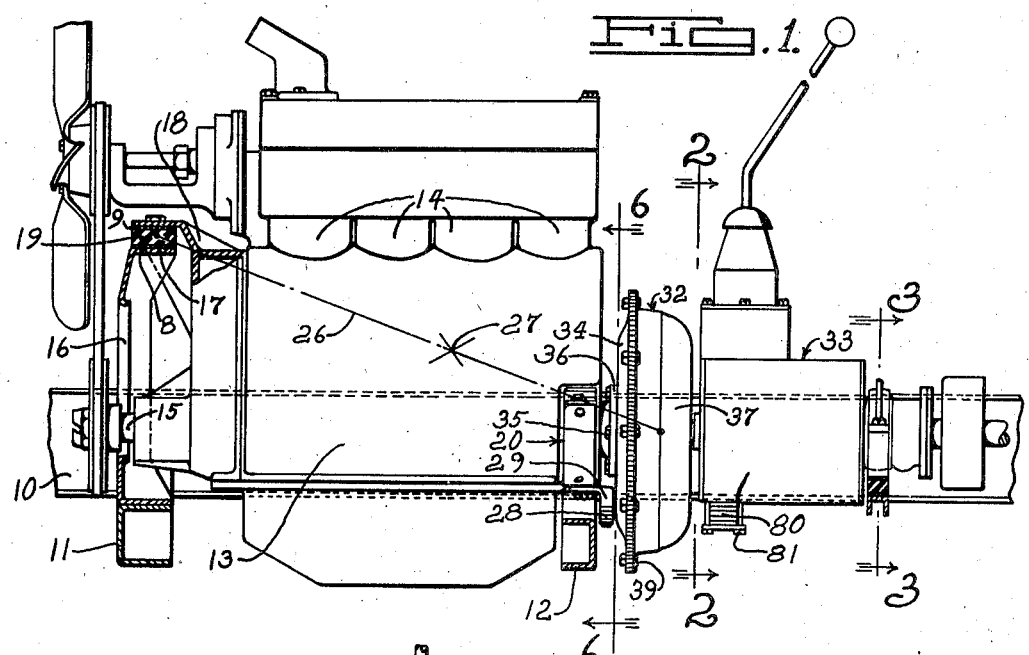
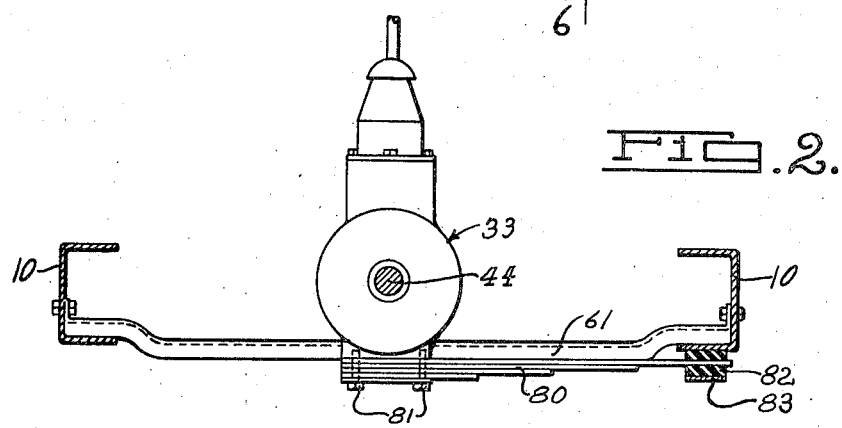
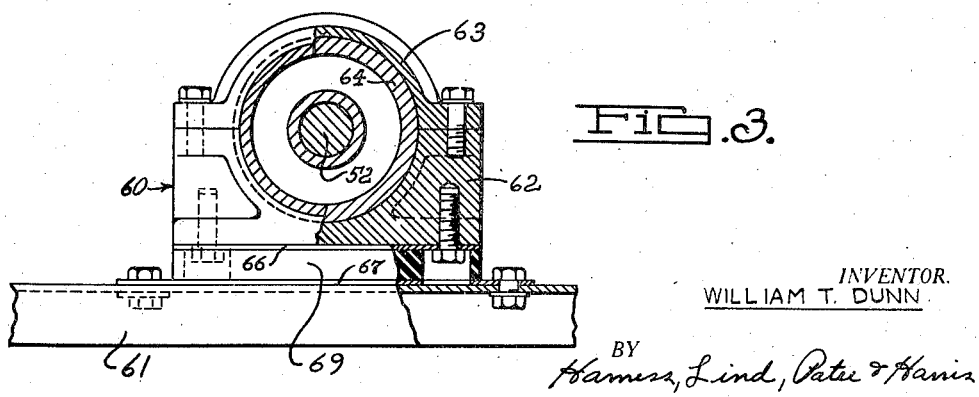
INVENTOR.
WILLIAM T. DUNN
BY
ATTORNEYS Sept. 13, 1938.　　　W. T. DUNN　　　2,129,829
COMBINED MOTOR AND TRANSMISSION MOUNTING
Filed Dec. 21, 1935　　　3 Sheets-Sheet 2
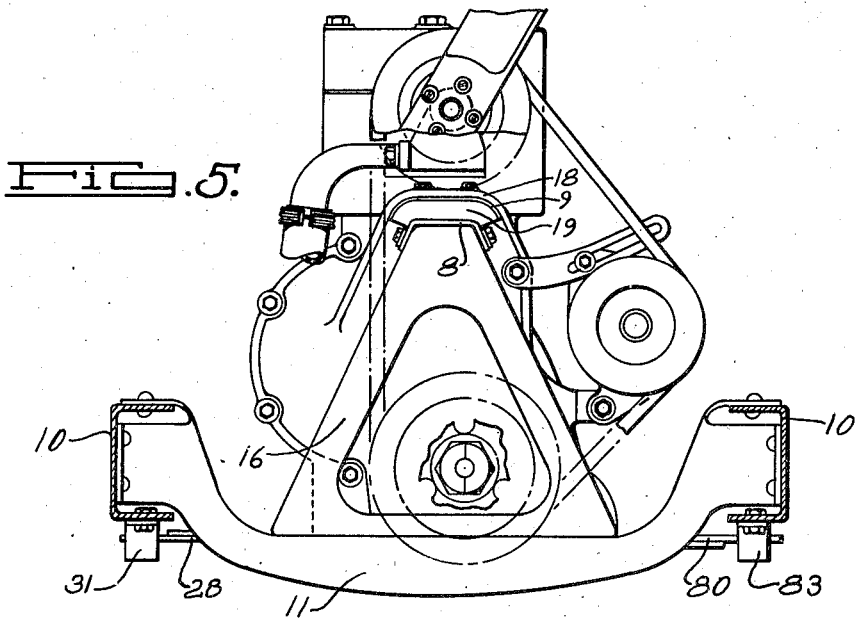
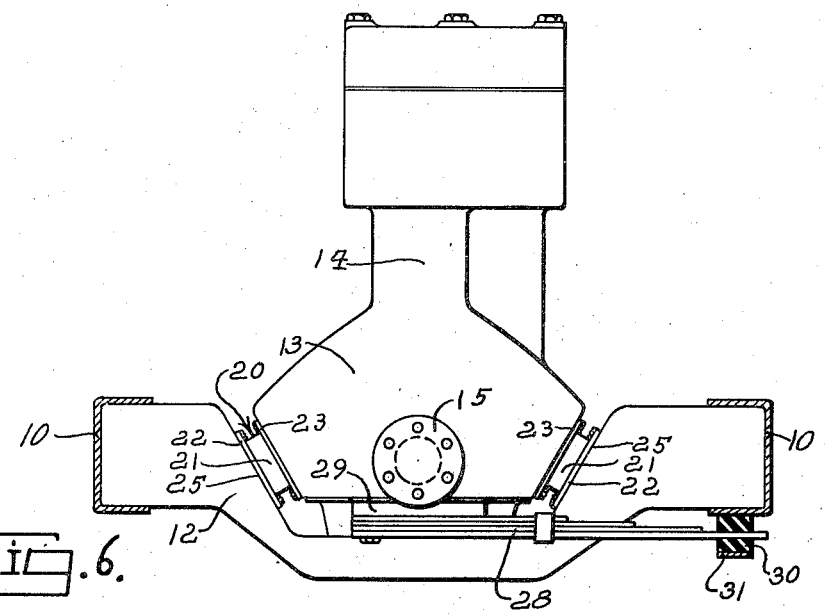
INVENTOR.
WILLIAM T. DUNN
BY
Harness, Dind, Pates & Harris.
ATTORNEYS Sept. 13, 1938. W. T. DUNN 2,129,849
COMBINED MOTOR AND TRANSMISSION MOUNTING
Filed Dec. 21, 1935 3 Sheets-Sheet 3
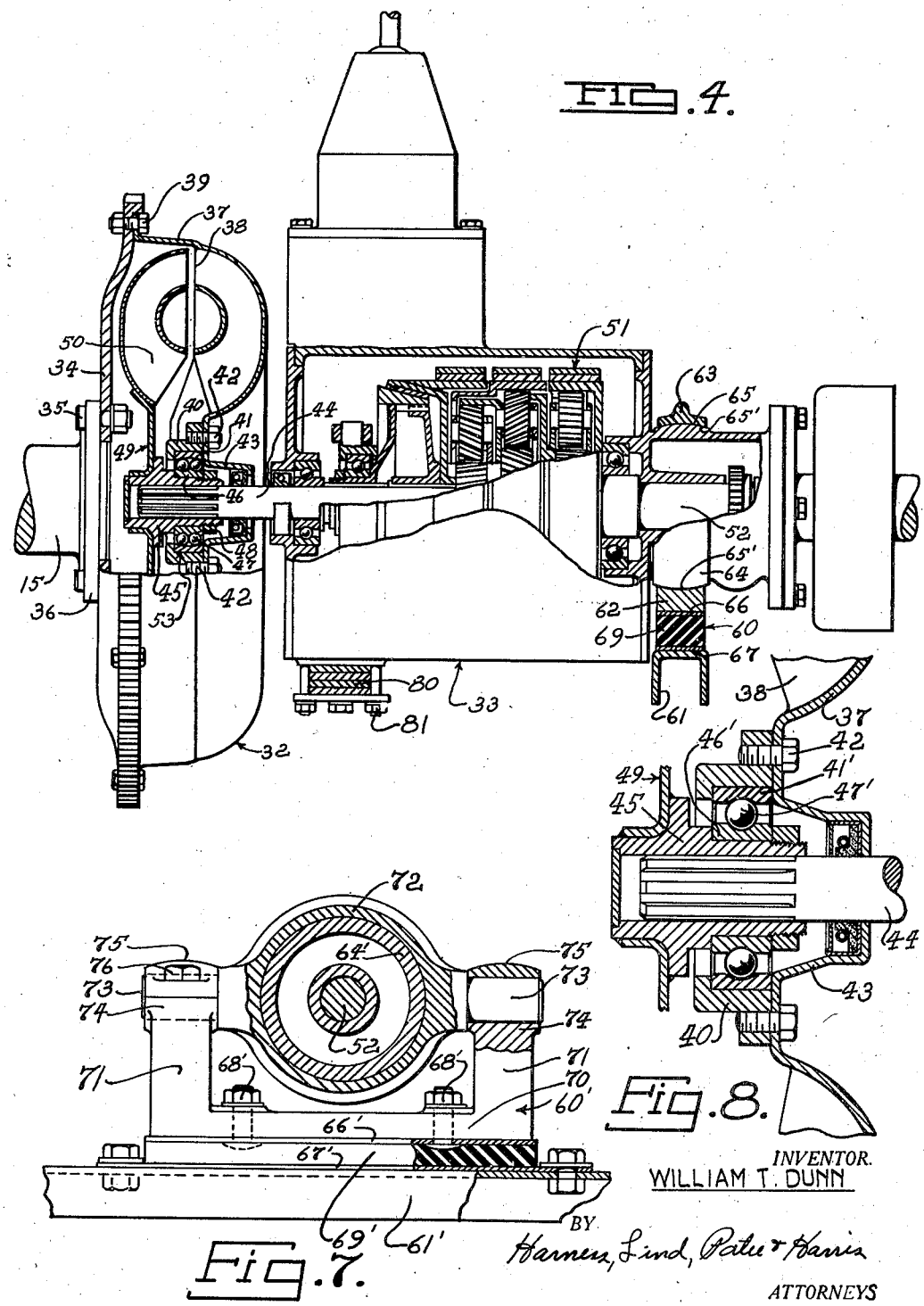
INVENTOR.
WILLIAM T. DUNN
BY
Harness, Lind, Patu & Harris
ATTORNEYS Patented Sept. 13, 1938

2,129,829

UNITED STATES PATENT OFFICE 2,129,829

COMBINED MOTOR AND TRANSMISSION MOUNTING

William T. Dunn, Detroit, Mich., assignor to Chrysler Corporation, Highland Park, Mich., a corporation of Delaware Application December 21, 1935, Serial No. 55,554

6 Claims. (Cl. 180—64)

This invention relates to an improved mounting for an internal combustion engine power unit.

More specifically, the invention pertains to a mounting for a power unit of this character which includes an internal combustion engine, transmission and interconnecting clutch mechanism, preferably of the hydraulic or fluid coupling type although the mountings may also be employed to advantage in a power unit of this character having a friction or other clutch.

One of the main objects of the invention is to so yieldably mount both the engine and transmission portions of a power unit that each may oscillate, vibrate, or otherwise move independently of and relative to the other and to the rigid frame structure by which power units of this character are generally supported.

Another object of the invention is to provide a mounting of this kind which will accommodate oscillatory movement of the engine and parts carried thereby about one axis, preferably extending through the center of mass of the engine, and engine carried parts, in response to torque reaction impulses, and which will accommodate oscillatory movement, preferably of a universal nature, of the transmission and parts carried thereby about a different axis.

A further object of the invention is to provide means for so mounting the transmission portion of the engine unit that it may oscillate independently of the engine and about an axis which is generally coincidental with the drive shaft that is driven by the unit and to thereby substantially eliminate whipping of the drive shaft by engine or transmission movement.

An additional object of the invention is to provide for suitable relative movement between the driving and driven parts of the clutch to accommodate independent oscillation of the engine and transmission portions of the unit.

A still further object of the invention is to provide a mounting of this kind by which movement of the gear shift lever and other controls associated with the transmission, by oscillatory or vibratory movement of the engine are effectively guarded against.

Additional objects of the invention are to provide a combined mounting for the transmission mechanism and bearing for one of the parts of the clutch associated therewith which accommodates movement of the transmission in response to torque reaction and other forces and by which a substantial portion of the weight of the transmission mechanism is sustained; to provide yieldable mounting members between the engine unit and frame structure at each point of connection therebetween; to provide a pair of yieldable mounting members having sound insulating properties between the engine unit and the frame structure, one of which is located in longitudinally spaced relationship from each opposite side of the weight sustaining bearing so as to facilitate insulation of the transmission mechanism from the frame structure while employing only one mounting member to directly support a portion of the weight of the transmission and to accommodate oscillatory movement thereof; to provide a mounting of this character in an engine unit having a fluid or hydraulic coupling type clutch provided with a driving part adjacent one end of the transmission; to provide means in the driving part of the clutch for receiving and supporting the driven part of the clutch as well as a shaft of the transmission so as to thereby sustain a portion of the weight of the transmission; to provide a spherically curved surface on one of the parts of the weight supporting bearing of this character which accommodates substantially universal bodily movement of the transmission shaft journal bearing as well as the transmission mechanism as a whole; and to provide mounting members for independently oscillatively supporting an engine and transmission mechanism which are so constructed and arranged as to dispense with bell housing structure for the clutch means so that the clutch and hydraulic medium of a fluid coupling may be effectively cooled by the surrounding atmosphere.

A still further object of the invention is to provide in the mounting of an internal combustion unit of the foregoing character means for resiliently and independently opposing oscillatory movement of the engine portion of the unit and the transmission portion thereof respectively.

A further object of the invention is to provide oscillatory movement opposing means of the foregoing character by which the natural frequencies of the engine portion of the unit and the transmission portion thereof on their respective mountings may be individually predetermined and brought to selected predetermined value.

An illustrative embodiment of the invention is shown in the accompanying drawings, in which:

Fig. 1 is a side elevational view, partly in section, of an internal combustion engine unit mounting in accordance with the invention.

Fig. 2 is a transverse, vertical sectional view taken on the line 2—2 of Fig. 1.

Fig. 3 is a transverse sectional view taken on the line 3—3 of Fig. 1.

Fig. 4 is a fragmentary side elevational view of the rear end portion of the engine unit and mounting shown in Fig. 1, portions thereof being broken away and shown in section to disclose the underlying structure.

Fig. 5 is a front end elevational view of the engine unit and its mounting.

Fig. 6 is a transverse sectional view taken on line 6—6 of Fig. 1.

Fig. 7 is an elevational view, partly in section, of a transmission mounting member embodying a further development of the invention.

Fig. 8 is an enlarged fragmentary sectional view of a bearing embodying a further development of the invention and which is suitable for oscillatively supporting one end of a transmission and journalling a shaft thereon.

In the form shown, the improved internal combustion engine mounting is illustrated in conjunction with a vehicle chassis frame which includes longitudinally extending channel members 10 and rigid transversely disposed front and rear members 11 and 12, respectively, which are secured to the longitudinal channel members by means of bolts, rivets, welding, or other suitable means. The transverse frame member 11 is located at the front of the vehicle chassis and the transverse member 12 is spaced rearwardly therefrom a distance slightly greater than the length of the crankcase 13 of the engine.

The internal combustion engine is of the multiple cylinder type having, for the purposes of illustration, four aligned cylinders 14. Slidably mounted in each cylinder is a reciprocable piston (not shown) to which is pivotally attached a connecting rod (not shown) which is journalled at its lower end on a crankshaft 15 in the usual manner.

The transverse member 11 of the frame structure has an upstanding intermediate portion 16, best shown in Fig. 1, on the upper extremity of which is provided a flange 17 which forms a support for and registers with a corresponding bracket 18 on the front end of the crankcase 13. Interposed between the flange 17 of the upstanding intermediate portion 16 and the bracket 18 of the crankcase 13 is a mounting member comprising a pair of spaced sheet metal plates 8 and 9 between which is disposed a rubber mounting element 19. The rubber element 19 is secured by vulcanization, or in any other suitable manner, to the adjacent sides of the plates 8 and 9 which are in turn bolted or otherwise fixed to the flange 17 and bracket 18, respectively. The rubber element 19 yieldably and resiliently oscillatively supports the weight of the front end portion of the engine part of the unit. All of the remaining weight of the engine portion of the unit is yieldably and resiliently supported by a pair of inclined mounting members, generally designated by the number 20, each having a rubber block 21 which is interposed between and bonded by vulcanization or otherwise secured to the adjacent surfaces of a pair of spaced plates 22 and 23, respectively. The lower plates 22 of the rear engine mounting members are bolted or otherwise suitably secured to correspondingly inclined surfaces 25 on the transverse chassis member 12.

The front and rear engine mounting members are preferably so located both laterally and vertically with respect to the engine structure as to accommodate that oscillatory movement thereof which is produced by the torque reaction impulses of the engine about an axis, designated by the numeral 26, which extends substantially through the center of mass of the engine portion of the unit, illustrated at 27.

The engine portion of the unit may be mounted in various ways so as to oscillate about a predetermined axis. It is preferable to provide rubber supporting elements for accommodating the oscillatory movement of the engine in order to derive the advantages of sound insulation but other resilient materials may be used for this purpose.

The resilient weight supporting elements of the engine mounting members may be alone relied upon to control the oscillatory movement of the engine part of the unit or auxiliary resilient means may be used to accomplish this result. In the form shown, a leaf spring 28 coacts resiliently between the frame structure and the crankcase 13 of the engine to resiliently oppose oscillatory movement of the latter. The inner end of the leaf spring 28 is rigidly fixed to the crankcase 13 by a clamping bracket 29 and the outer end portion thereof is resiliently attached to one of the channel members 10 of the chassis frame by a rubber block 30 having a slot therein in which the outer end portion of the main leaf of the spring is received. The rubber block 30 is attached to the channel member 10 of the chassis frame by a bracket 31. The spring 28 is preferably so constructed and arranged as to predetermine the natural vibration frequency of the engine on its mountings at a value below the frequency of the torque reaction impulses of the engine at the lower end of the driving range.

Mounted on the rear end of the engine crankshaft 15 is a casing, generally designated by the numeral 32, which constitutes the driving or impelling element of a fluid coupling by which the torque of the crankshaft 15 is applied on a variable speed transmission, generally designated by the numeral 33. The casing of the fluid coupling 32 includes a disc portion 34, secured by bolts 35 to a flange 36 on the rear end portion of the crankshaft 15. A cover 37 having impelling vanes 38 on its internal sides is removably mounted on the outer marginal portions of the disc 34 by bolts 39. Mounted centrally of the cover 37 is a bearing retaining ring 40 in which is disposed an outer bearing race member 41 of a bearing generally designated by the numeral 53 in Fig. 4. The race member 41 and bearing retaining ring 40 are detachably secured to the cover 37 by bolts 42. The central portion of the cover 37 is provided with an integral, outwardly extending hollow tubular boss 43 having an open extremity through which a driving shaft 44 of the transmission 33 extends.

Splined on the front end of the shaft 44 is a hub 45 on which is mounted a bearing race 46. Ball bearings 47 are disposed between the bearing races 41 and 46 as illustrated in Fig. 4. In the form of the invention illustrated in Fig. 4, there are provided two series of ball bearings 47, each series being confined in a groove 48 formed in the outer periphery of the inner bearing race 46. The inner periphery of the bearing race 41 has a substantially spherically concaved surface which accommodates substantially universal movement of the shaft 44 and hub 45 thereon relative to the crankshaft 15 and fluid coupling casing 32. Provision for similar universal movement of the parts may be made, as illustrated in Fig. 8, in a bearing in which only one series of ball bearings is employed. In this form of the invention the inner race member 46' is substantially identical to the inner bearing race member 46 shown in Fig. 4 with the exception that it is provided with only one peripheral groove. The inner peripheral groove of the outer bearing race member 41' has a curvature which, although not spherical, has a longer radius than the radius of the ball bearings 47' which are disposed between the race members. In order to accommodate the desired universal movement of the shaft 44 relative to the crankshaft 15, the radius of the ball bearing groove of the race member 41' may vary from a radius slightly greater than the radius of the ball bearing 47' to a radius equal to the maximum distance of the surface of the groove from the axis of the shaft 44.

The driven element or runner of the fluid coupling, generally designated by the numeral 49, is rigidly fixed to the hub 45 by welding or other suitable means. This driven coupling element includes vanes 50 upon which the force of the fluid medium contained in the fluid coupling casing 32 is applied during operation of the engine.

The shaft 44 corresponds to the driving shaft of the transmission, which in the form shown in Fig. 4, is of the planetary type. The gear train, generally designated by the numeral 51 in Fig. 4, selectively establishes diverse gear ratios between the shaft 44 and a final driven shaft 52 of the transmission. The shaft 52 may be operatively connected with a propeller shaft (not shown) by a universal joint or coupling of the type conventionally used in vehicles.

The weight of the front end portion of the transmission 33 is supported by the crankshaft 15 through the medium of the fluid coupling impeller casing 32 and the bearing 53 carried thereby. The weight of the rear end portion of the transmission is oscillatively supported by a mounting member, generally designated by the numeral 60 carried by a transverse frame member 61 which, as illustrated in Fig. 2, is rigidly fixed to the opposite channel members 10 of the chassis frame. The rear mounting member 60 includes the metallic bearing block 62 and a complementary bearing cap 63 having registering flanges secured together by suitable bolts. Journalled in the bearing provided by the block 62 and cap 63 is a hollow drum 64 which is preferably formed integral with or rigidly fixed to the casing of the transmission 33. The drum 64 has a spherically convexed portion 65 complementary to a spherically concaved bearing surface 65' on the inner peripheries of the bearing block 62 and cap 63.

Interposed between the bearing block 62 and the transverse frame member 61 is a rubber block 69 having plates 66 and 67 on its upper and lower sides respectively. The plates 66 and 67 are rigidly attached by vulcanization or other suitable means to the upper and lower sides of the rubber block 69 and the plate 66 is bolted or otherwise fixed to the bearing block 62, whereas the lower plate 67 is secured by bolts or similar means to the transverse frame member 61.

In the form of the invention illustrated in Fig. 7 the rear transmission mounting member 60' includes a yoke-shaped support 70 provided with upstanding arms 71, one located on each side of the drum 64' on the rear end portion of the transmission housing. The drum 64' has an external peripheral portion of substantially cylindrical shape journalled in a bearing ring 72 having diametrically opposite trunnions 73 thereon which are in turn journalled in bearings 74 on the outer ends of the legs 71 of the yoke 70. The bearings 74 are provided with removable caps 75 which are detachably secured thereon by bolts 76.

The yoke 70 is carried by a transverse frame member 61' to which it is attached by a yieldable support interposed between it and the transverse frame member. The yieldable support includes a rubber block 69' having plates 66' and 67' rigidly attached by vulcanization or other suitable means to its upper and lower sides respectively. The end portions of the plate 66' are secured by bolts 68' to the yoke 60' and the opposite end portions of the plate 67' are similarly secured to the transverse frame member 61'.

Either of the foregoing rear transmission supports will accommodate both oscillatory and vibratory movement of the rear end portion of the transmission and also yieldably support the transmission so that it may oscillate in response to torque reaction or other movement producing forces. Such oscillatory movement of the transmission is wholly independent of the engine portion of the unit and is resiliently opposed by a spring 80, shown in Fig. 2, or other suitable resilient means. The spring 80 has its inner end portion rigidly fixed by clamps 81 to the lower side of the transmission housing and its outer end portion yieldably secured to one of the channel members 10 of the chassis frame by a resilient block 82, preferably comprising rubber. The block 82 is clamped on the lower flange of the channel member 10 by a bracket 83 and it is provided with a slot for receiving the outer end portion of the spring 80.

By independently oscillatively mounting both the engine portion and the transmission portion of a power unit of this character, both the engine and transmission are permitted to oscillate about individually predetermined axes and, if desired, against different predetermined restraining influences, preferably of a resiliently acting character, in absorbing torque reactions and other movement displacing forces. Inasmuch as the engine and transmission portions of the unit are not rigidly connected together, so as to move in unison, the torque reactions of the engine are not applied directly on the transmission portion of the unit. The transmission portion of the unit is supported in part by the engine and in part by a resiliently yieldable mounting member which accommodates oscillatory movement of the transmission about an axis extending generally in the direction of the propeller shaft and therefore such oscillatory movement of the transmission does not cause whipping of the forward end of the propeller shaft. In predetermining the location of the axis of oscillation of the engine portion of the unit, it is unnecessary to consider the weight and mass of the transmission and as a result proper location of the mountings to bring this axis through the center of mass of the engine is greatly simplified. Each relatively oscillatable part of the engine unit may be resiliently or otherwise independently restrained by means which may be individually conditioned to bring the natural oscillation frequency of the engine and transmission portions to respectively different predetermined values. In this manner synchronizing of the frequencies of the impulses which disturb the respective parts of the engine unit with the natural vibration frequencies of such portions of the unit on their mountings can be effectively and conveniently guarded against, thereby overcoming the creation of synchronous vibration and the resulting sound disturbances.

Although but several specific embodiments of the invention are herein shown and described, it will be understood that various changes in the size, shape and arrangement of parts may be made without departing from the spirit of my invention.

What I claim is:

1. The combination of an internal combustion engine unit including an engine portion, a power transmitting portion for applying the torque of said engine portion to a rotative member and a fluid coupling between said engine and transmission portions having axially spaced fluid impelling and fluid impelled elements connected with said engine and transmission portions, respectively, a frame structure, means for mounting said engine unit on said frame structure for oscillation about an axis extending substantially through the center of mass of said engine portion, and means for mounting said power transmitting portion for oscillation relative to said frame structure about a different axis and including a bearing member in said fluid coupling substantially radially aligned with the space between said fluid impelling and fluid impelled elements and a yieldable mounting member interposed between said frame structure and a part of said transmission portion remote from said bearing.

2. The combination of an internal combustion engine unit including an engine portion, a power transmitting portion for applying the torque of said engine portion to a rotative member and a fluid coupling between said engine and transmission portions having axially spaced fluid impelling and fluid impelled elements connected with said engine and transmission portions, respectively, a frame structure, means for mounting said engine unit on said frame structure for oscillation about an axis extending substantially through the center of mass of said engine portion, and means for mounting said power transmitting portion for oscillation about a different axis extending in the general direction of the axis of said rotative member and including a bearing member in said fluid coupling substantially radially aligned with the space between said fluid impelling and fluid impelled elements and a yieldable mounting member interposed between said frame structure and a part of said transmission portion remote from said bearing.

3. An internal combustion engine unit including an engine portion having a crankshaft, transmission mechanism having a main drive shaft, a fluid coupling including a casing secured to said crankshaft having a fluid medium therein and provided with driving means for impelling said fluid medium, and including a driven member in said casing spaced axially from said driving means and rotatable by said medium and fixed to said transmission drive shaft, a bearing in said casing substantially radially aligned with the space between said driving means and said driven member rotatably supporting said shaft, said bearing being so constructed and arranged as to oscillatively support an end portion of said transmission mechanism and accommodate universal movement thereof about said end portion without substantially misaligning the effective portions of said driving means and driven member.

4. A power transmitting unit including a supporting structure, driving and driven members mounted thereon, yieldable means interposed between one of said members and said structure for oscillatively supporting an end portion thereof remote from said other member, a fluid coupling casing secured to said driving member having therein a fluid medium and an element for impelling the latter, a driven fluid coupling element in said casing spaced axially from said impelling element and rotatable by said medium, means for non-rotatably securing said driven element to said driven member, a bearing in said casing substantially radially aligned with the space between said impelling and driven elements rotatably supporting the opposite end portion of said yieldably supported member, said bearing being so constructed and arranged as to oscillatively support an end portion of said yieldably supported member and accommodate universal movement thereof without substantially misaligning the effective portions of said impelling and driven elements.

5. A power unit including a frame structure, driving mechanism including a driving member, means comprising yieldable members interposed between said frame structure and said driving mechanism for oscillatively supporting the latter, driven mechanism having a driven member adjacent said driving member, yieldable members interposed between said frame structure and said driven mechanism at an end portion thereof remote from said driving mechanism for supporting and accommodating oscillatory movement of said driven mechanism relative to said frame structure and said driving mechanism, a fluid coupling casing secured to said driving member having therein a fluid medium and an element for impelling the latter, a driven fluid coupling element in said casing spaced axially from said impelling element and rotatable by said medium, means for non-rotatably securing said driven element to said driven member, a bearing in said casing substantially radially aligned with the space between said impelling and driven elements rotatably supporting said driven member, said bearing being so constructed and arranged as to oscillatively support an end portion of said driven mechanism and accommodate universal movement thereof without substantially misaligning the effective portions of said impelling and driven elements.

6. A power transmitting unit including a supporting structure, driving and driven members thereon, a fluid coupling casing having a fluid medium therein, an element in said casing for impelling said fluid medium, an element in said casing rotatable by said medium and spaced axially from said impelling element, one of said elements being non-rotatably connected with said driving member and the other element being non-rotatably connected with said driven member, a bearing in said casing substantially radially aligned with the space between said elements for rotatively supporting one of said members and being so constructed and arranged as to oscillatively support an end portion of the latter and to accommodate universal movement thereof without substantially misaligning the effective portions of said elements, and supporting means acting between said supporting structure and said members for accommodating relative oscillatory movement of the latter.

WILLIAM T. DUNN.